United States Patent
Kennedy et al.

(10) Patent No.: US 9,594,170 B2
(45) Date of Patent: Mar. 14, 2017

(54) PERFORMANCE IMPROVEMENTS FOR MEASUREMENT OF OPPORTUNITY GEOLOCATION/NAVIGATION SYSTEMS

(71) Applicant: Echo Ridge LLC, Great Falls, VA (US)

(72) Inventors: Joseph P. Kennedy, Great Falls, VA (US); John Carlson, Dulles, VA (US)

(73) Assignee: Echo Ridge LLC, Great Falls, VA (US)

( * ) Notice: Subject to any disclaimer, the term of this patent is extended or adjusted under 35 U.S.C. 154(b) by 282 days.

(21) Appl. No.: 13/909,824

(22) Filed: Jun. 4, 2013

(65) Prior Publication Data

US 2013/0265193 A1    Oct. 10, 2013

Related U.S. Application Data

(63) Continuation of application No. 13/250,154, filed on Sep. 30, 2011, now Pat. No. 8,805,456.

(60) Provisional application No. 61/655,066, filed on Jun. 4, 2012.

(51) Int. Cl.
| | |
|---|---|
| *G01S 19/42* | (2010.01) |
| *G01S 19/46* | (2010.01) |
| *G01S 19/24* | (2010.01) |
| *G01S 19/18* | (2010.01) |
| *G01S 19/22* | (2010.01) |
| *G01S 19/48* | (2010.01) |

(52) U.S. Cl.
CPC ............ *G01S 19/46* (2013.01); *G01S 19/246* (2013.01); *G01S 19/18* (2013.01); *G01S 19/22* (2013.01); *G01S 19/48* (2013.01)

(58) Field of Classification Search
CPC .......... G01S 19/46; G01S 19/48; G01S 19/11; G01S 19/246

USPC ............. 342/357.25, 357.29, 357.34, 357.4
See application file for complete search history.

(56) References Cited

U.S. PATENT DOCUMENTS

| | | | |
|---|---|---|---|
| 5,794,128 A | 8/1998 | Brockel et al. | |
| 5,917,449 A | 6/1999 | Sanderford et al. | |
| 6,094,168 A | 7/2000 | Duffett-Smith et al. | |
| 6,275,705 B1 | 8/2001 | Drane et al. | |
| 6,393,292 B1 | 5/2002 | Lin | |
| 6,492,945 B2 | 12/2002 | Counselman, III et al. | |
| 6,522,890 B2* | 2/2003 | Drane ..................... | G01S 1/024 342/357.31 |
| 6,571,082 B1 | 5/2003 | Rahman et al. | |
| 6,865,395 B2 | 3/2005 | Riley | |
| 6,978,131 B1 | 12/2005 | Lee | |
| 7,035,650 B1 | 4/2006 | Moskowitz et al. | |
| 7,171,345 B2 | 1/2007 | Mocek | |

(Continued)

FOREIGN PATENT DOCUMENTS

| | | | |
|---|---|---|---|
| WO | 2007113086 A1 | 10/2007 | |
| WO | 2008119635 A1 | 10/2008 | |
| WO | 2009112293 A1 | 9/2009 | |

OTHER PUBLICATIONS

Derek Kurth, "Range-Only Robot Localization and SLAM with Radio", Robotics Institute, Carnegie Mellon University, May 2004, 60 pages.

*Primary Examiner* — Marcus Windrich
(74) *Attorney, Agent, or Firm* — Duane Morris LLP

(57) ABSTRACT

A system and method of determining the location of a mobile device using signals of opportunity, derived time stamps and sharing of signal information with other mobile devices.

13 Claims, 11 Drawing Sheets

Evolution of GNSS Receiver to SDR Technology

(56) References Cited

U.S. PATENT DOCUMENTS

| | | | |
|---|---|---|---|
| 7,398,086 B2 | 7/2008 | Morgand et al. | |
| 7,620,368 B2 | 11/2009 | Wang et al. | |
| 7,750,848 B2 * | 7/2010 | Normark | G01S 19/28 |
| | | | 342/357.25 |
| 7,773,995 B2 | 8/2010 | Rappaport et al. | |
| 8,000,656 B1 | 8/2011 | Jiao et al. | |
| 8,018,383 B1 | 9/2011 | Schantz et al. | |
| 8,086,187 B1 | 12/2011 | Davis et al. | |
| 8,106,818 B2 * | 1/2012 | Bhattacharya | G01S 19/48 |
| | | | 342/357.29 |
| 8,126,453 B2 | 2/2012 | Wang | |
| 8,229,416 B2 | 7/2012 | Akman et al. | |
| 8,270,910 B2 | 9/2012 | Picard | |
| 8,332,198 B1 | 12/2012 | Barclay et al. | |
| 8,339,142 B2 | 12/2012 | Oowada | |
| 8,339,310 B2 * | 12/2012 | Mizuochi | G01S 19/48 |
| | | | 342/357.23 |
| 8,437,772 B2 * | 5/2013 | Moeglein | G01S 5/021 |
| | | | 342/357.29 |
| 8,843,077 B2 | 9/2014 | Haran | |
| 2002/0160717 A1 | 10/2002 | Persson et al. | |
| 2004/0008138 A1 * | 1/2004 | Hockley, Jr. | G01S 5/0072 |
| | | | 342/357.48 |
| 2005/0085223 A1 | 4/2005 | Liu | |
| 2005/0197769 A1 * | 9/2005 | Soehren | G01C 21/165 |
| | | | 701/472 |
| 2005/0200525 A1 | 9/2005 | Duffett-Smith et al. | |
| 2005/0260962 A1 | 11/2005 | Nazrul et al. | |
| 2006/0094365 A1 | 5/2006 | Inogai et al. | |
| 2006/0128315 A1 | 6/2006 | Belcea | |
| 2006/0148429 A1 | 7/2006 | Inogai et al. | |
| 2006/0174162 A1 | 8/2006 | Varadarajan et al. | |
| 2006/0229018 A1 | 10/2006 | Mlinarsky et al. | |
| 2006/0229020 A1 | 10/2006 | Mlinarsky et al. | |
| 2006/0240839 A1 * | 10/2006 | Chen | G01S 5/06 |
| | | | 455/456.1 |
| 2007/0019769 A1 | 1/2007 | Green et al. | |
| 2007/0072552 A1 | 3/2007 | Jonsson et al. | |
| 2007/0127559 A1 | 6/2007 | Chang | |
| 2007/0223571 A1 | 9/2007 | Viss | |
| 2008/0026748 A1 | 1/2008 | Alexander et al. | |
| 2008/0057873 A1 | 3/2008 | Huang et al. | |
| 2008/0084951 A1 | 4/2008 | Chen et al. | |
| 2008/0274753 A1 * | 11/2008 | Attar | G01S 5/0205 |
| | | | 455/456.6 |
| 2009/0094492 A1 | 4/2009 | Music et al. | |
| 2009/0113245 A1 | 4/2009 | Conner | |
| 2009/0213828 A1 | 8/2009 | Brundage et al. | |
| 2009/0233621 A1 | 9/2009 | Rhoads et al. | |
| 2009/0281729 A1 * | 11/2009 | Duffett-Smith | G01S 19/46 |
| | | | 701/469 |
| 2010/0062722 A1 | 3/2010 | Dykema et al. | |
| 2010/0099361 A1 | 4/2010 | Lundstrom et al. | |
| 2011/0065457 A1 * | 3/2011 | Moeglein | G01S 5/021 |
| | | | 455/456.6 |
| 2011/0109504 A1 * | 5/2011 | Ellis | G01S 19/46 |
| | | | 342/357.29 |
| 2011/0124295 A1 | 5/2011 | Mahjoubi Amine et al. | |
| 2011/0136457 A1 | 6/2011 | Yu | |
| 2011/0223869 A1 | 9/2011 | Harteneck | |
| 2011/0234454 A1 * | 9/2011 | Mathews | G01S 5/021 |
| | | | 342/357.25 |
| 2011/0287721 A1 | 11/2011 | Haran | |
| 2011/0306306 A1 | 12/2011 | Reed | |
| 2012/0071107 A1 | 3/2012 | Falck et al. | |
| 2012/0225624 A1 | 9/2012 | Kyosti et al. | |
| 2013/0029608 A1 | 1/2013 | Kuo et al. | |
| 2013/0231060 A1 | 9/2013 | Ozaki et al. | |
| 2014/0051363 A1 | 2/2014 | Kennedy et al. | |

\* cited by examiner

Vector-based GNSS Receiver Architecture
(Prior Art)

Vector Delay Lock Loop
(Prior Art)

Code Phase Vector Tracker (VDLL)
(Prior Art)

Carrier Frequency Vector Tracker (VFLL)
(Prior Art)

Laser Scanner Range vs. Angle Data for Wall Segments
(Prior Art)

Feature Representation and Map Sharing
(Prior Art)

SMARTS Algorithm
(Prior Art)

HIGGS Algorithm
(Prior Art)

Evolution of GNSS Receiver to SDR Technology

KBS System Applied to CMACS

PERFORMANCE IMPROVEMENTS FOR MEASUREMENT OF OPPORTUNITY GEOLOCATION/NAVIGATION SYSTEMS

The present application claims the priority U.S. Provisional Patent Application Ser. No. 61/655,066 filed Jun. 4, 2012, the disclosure of which is hereby incorporated by reference. The present application is also a continuation in part of U.S. patent application Ser. No. 13/250,134, titled "System and Method for Robust Navigation and Geolocation Using Measurements of Opportunity" filed Sep. 30, 2011, the disclosure of which is hereby incorporated by reference herein.

The U.S. Government has a paid-up license in this invention and the right in limited circumstances to require the patent owner to license others on reasonable terms as provided for by the terms of Contract No. awarded by FA8651-09-M-0100 and by the terms of Contract No. awarded by FA9453-12-M-0338.

The present disclosure summary relates to the field of robust, high accuracy navigation and geolocation. More specifically, this disclosure describes system and method improvements to opportunistically capture and use measurements on a priori unknown radio signals not intended for radio navigation or geolocation, and non-radio sources to improve navigation/geolocation position estimation yield and accuracy Important prior art in the areas of inertial measurements, radio geolocation methods, simultaneous localization and mapping (SLAM), RF communication system architectures and platforms is summarized in U.S. patent application Ser. No. 13/250,134. Additional prior art is summarized below.

A prior art method of location determination using satellites is known as ultra-tight coupling. Ultra-tight coupling typically used all satellite measurements and mechanical measurements in a statistical filter framework (such as an extended Kalman filter (EKF)) to estimate the time and position of the host platform so that the carrier frequency and code phase are can be accurately estimated for tracking of a satellite in attenuated/multipath propagation scenarios. In describing the signal processing algorithms for software defined radio (SDR)-based global navigation satellite system (GNSS) receivers as shown in FIG. 1, a convention is used to decompose the receiver in functional layers, much like what is done with communications networks. The physical layer is defined as the functions from the antenna to the A/D converter 100, the measurement layer as the acquisition and tracking functions 110, and the application layer as the location/time estimating Kalman Filter 120. A VDFLL (vector delay frequency lock loop) is used as the basis architecture in this description. The VDFLL has been well documented in the literature including in "Implementation of a Vector-based Tracking Loop Receiver in a Pseudolite Navigation System" by Hyoungmin So et al, published in Sensors in 2010 (referred to later as "So reference"). The VDFLL portion includes the satellite vehicle carrier frequency tracker 130, the satellite vehicle code phase tracker 140 and the Kalman navigation filter 150.

FIG. 2 illustrates an embodiment of a vector delay lock loop described in the So reference. The code phase and carrier frequency reference generation is done on a per satellite vehicle (SV) basis (represented as CH 1 to CH N 200), with a common function for control for the generators (vector tracking algorithm 210). The VDFLL produces measurements and discriminator outputs (or residuals) 230 for use by the Navigation Estimator 220.

FIG. 3 illustrates one prior art implementation of the code phase tracking loop (vector delay lock loop (VDLL)) described in the So reference.

FIG. 4 illustrates one prior art implementation of the carrier frequency tracking loop (vector frequency lock loop (VFLL)) described in the So reference.

In FIGS. 3 and 4, the ultra-tight coupling refers to the control 300, 400 of the carrier and code tracking loops by the Kalman Navigation filter. The filter's state vector is based on measurements made across all satellite vehicles (SVs) over time. In addition to historical satellite data, the filter state vector may also be based on inertial navigation system (INS) measurements in prior art descriptions of ultra-tight coupling.

Another prior art location technology is known as conventional simultaneous location and mapping (SLAM) using optical landmarks. U.S. patent application Ser. No. 13/250, 154 describes SLAM using RF sources as landmarks. The original SLAM/CSLAM/MA-SLAM formulation was based on optical sources as described below.

In the context of navigation, features can be broadly defined as unique entities that exist in the environment, are perceptible to the sensors used to detect them, and serve as navigation aids or landmarks. Traditional features are usually defined as such if a sensor is able to uniquely detect and identify it repeatedly from different positions in the environment. Sensors that exploit physical attributes and shapes through optical means can classify features as line segments, corners, edges, cylinders, geometric shapes, or groups of shapes. Physical features can easily scale to the environment size in which they exist, such as entire mountain profiles on a large scale, or doorframe edges in a small indoor scenario. Most navigation systems that exploit physical features for navigation purposes assume that they are stationary, however this is not required if the underlying navigation algorithms are robust enough to accommodate moving features.

One of the biggest challenges surrounding optical feature based navigation is the ability to not only detect the feature, but then to correctly classify it as a unique entity. This is known as data association. Mis-associating a feature can at a minimum, lead to inaccuracy of the navigation solution, or worse, divergence of the entire system. To reduce the chances of mis-association, sophisticated and often complex algorithms must be executed that aid in determining feature attributes that are invariant to scale and orientation. In addition, a process of outlier measurement discarding, segmenting, curve fitting, sorting, and weighting is often associated with the processing of optical features. Through the definition of a feature given above, ambient radio frequency signals, sometimes called Signals of Opportunity (SoOPs), may also serve as features for navigation, and have some unique qualities that will be discussed below.

Feature representation, in this context, is meant to describe the process by which sensor information is reduced (if at all) to uniquely describe a detected environmental feature, or landmark. A simple case of feature representation is one in which a laser-based range scanner transmits pulses of light which are reflected off of a physical surface such as an interior wall. After processing, this measurement data may be reduced to form a compact representation of the feature, such as the example in FIG. 5 where the $j^{th}$ wall is described by only 3 parameters:

$$w_j = [\theta x_j y_j l]^T$$

Where $\theta$ is the orientation of the detected wall with respect to the fixed coordinate system, $x_j y_j$ are the coordinates of the center of the wall in the same coordinate system, and l is the length of the wall. A group of N "wall" features could be compactly represented as shown below, requiring only 3N parameters to describe the entire feature set.

$$p=[w_1^T w_2^T \ldots w_N^T]$$

Compared to the original size of the data, this is a large reduction of information, where the original data could have been reduced from hundreds of samples of range versus angle data which was quickly captured by a modern laser scanner running at a high sampling rate over several seconds. FIG. 5 shows a sample plot of range versus angle data taken from a modern laser scanner (SICK LMS 200). Some systems may choose to reduce data such as this to a compact feature representation such as the one used in the simple wall example. From an information theory perspective, there is a large quantity of data captured from these scans that is certainly lost by representing the results as we previously discussed, only as a series of wall segments.

With respect to feature representation in Multi-Agent SLAM (MA-SLAM), an important observation to make is that multiple agents are making measurements against some set of common features that are observed by more than one agent. Because of the fact that the errors associated with each feature measurement from each agent are substantially independent, this statistically reduces the overall uncertainty of the landmark attributes, such as its position. This allows agents to achieve higher overall navigation accuracy through the use of lower quality measurements, provided that multiple agents can measure common subsets of features. This observation is exploited in the disclosed new method which is explained in more detail below.

Sharing of information and/or maps between agents in a MA-SLAM scenario can be implemented a variety of ways. Some of these options are shown in FIG. 6, and explained below. At one extreme, all raw sensor measurements from all agents could be shared between all other agents, providing a "full disclosure" scenario which guarantees that no information is lost through the compression of measurements and feature representation 600. A second class of information sharing is one in which some subset of the available processed sensor measurement data is inter-communicated between agents. In theory, the full disclosure scenario is optimal, but in practice would not be suitable in cases where the number of agents becomes large and the amount of data flowing between them could become very impractical. In addition, there could be enormous processing burden on each of the agents which must process all of the raw data, leading to a fairly inefficient solution. An additional concern is where the agents are all not directly connected to each other and must pass information through a peer-to-peer mechanism causing one or more agents to have to communicate not only their own measurement information but information about their peers as well. This is a very likely scenario in real operations as it in many cases one agent will not be able to have reliable communication to all other agents at the same time. Known ways to reduce the communications and processing burden in an MA-SLAM scenario include techniques such as:

Sharing of compressed feature representations to produce a centralized Extended Kalman Filter (EKF) scheme, where each agent independently forms the entire MA-SLAM state and covariance matrices 610.

Decentralized Kalman Filtering where only state estimates and the associated covariance matrices are shared between agents.

Distributing the processing of centralized MA-SLAM through multiple localized Kalman filters 620.

Each prior art method has its drawbacks such as a loss of information due to the compression of measurements in compact features, or redundancy of measurements being created as features get passed around between agents in fleet and become more heavily weighted within the measurement statistics. The best solution is one which finds an optimal compromise between feature representation, compression, and map sharing given the constraints of the operational environment such as communications bandwidth, processing power, and navigation accuracy requirements (to name a few). The present disclosure describes a new approach using an adaptive solution that can change the way each of these are handled as a function of the instantaneous environment and operating conditions, which is described in more detail below.

A number of significant factors affect the achievable performance of GNSS (GPS+other satellite navigation systems)-based location/navigation estimation systems. Some factors are creating the opportunity for increased performance, some threaten to reduce performance, and some cut both ways.

One significant factor is a commercial factor. A significant commercial navigation industry has grown up around the availability of the GPS system. Applications such as surveying, vehicle navigation, personal navigation, emergency services (E911), telecommunications systems time standards and heavy equipment navigation all depend on GPS. Entire industries rely on GPS as a necessity to properly function. This trend is expected to continue into the future. The commercial reliance on GPS limits the options for military users with respect to system modifications and operating procedures in times of conflict. Military GPS receiver performance improvements must be achieved without disruption of commercial services. The proliferation of commercial communication service demand and resultant pressure on spectrum allocation is acute and growing. This will lead to the increased likelihood of unintentional interference to GPS receivers in and near the GPS spectrum allocations.

Another significant factor is a technological factor. Software Defined Radio (SDR) technology (both hardware and signal processing algorithms) is rapidly making its way from the laboratory to the field. As software implemented signal processing makes its way closer to the antenna, and processing power per unit time/volume/power becomes more plentiful, more and more sophisticated signal processing algorithms can be deployed in mobile GNSS receivers. The improvements in navigation determination using the LMS (least mean square) method to the common use of EKF (extended Kalman filter) techniques is one example of this phenomena. The improvements in tracking loops from individual SV Costas carrier frequency tracking and delay lock code phase tracking to vector tracking using EKF is another example. Ultra-tight coupling with inertial navigation systems (INS) has also been enabled with SDR and improvements in processing power.

The negative consequences of SDR technology include the ease with which jamming and spoofing capabilities can be implemented and fielded. Commercially available SDR platforms such as the USRP2 from Ettus Research can easily be programmed to jam or spoof GNSS systems. These SDR platforms are a favorite research tool at universities who are pushing the state of the art in SDR functionality. The significant growing threat is GPS spoofing. With SDR technology, the ability to create false SV or complete constellation signals increases every day.

A proliferation of aiding/augmenting technologies are being introduced to make GPS more robust. In addition to the previously mentioned mechanical measurement augmentations (INS), other augmentations including assisted GPS (AGPS) and measurements on other non-navigation RF signals of opportunity (SoOPs).

The advancements in SDR hardware and software are expected to continue in the future. Threats will become more able and prolific, but the opportunity for more sophisticated GPS signal processing algorithms will also be possible.

Another significant factor is a political factor. The success of GPS is based on, international reliance on a U.S. military asset, and national pride has spawned the deployment (or planned deployment) of a number of global or regional satellite navigation capabilities including GLONASS, Galileo, and Beidou. The trend going forward will be for more of these systems to become operational and perhaps new systems to be announced.

Another significant factor is a military factor. In an analogous way to the civilian user market, the U.S. military has become very reliant on GPS for a large variety of uses. One of the most significant is for weapon guidance. The consequence of GPS navigation not being available in these circumstances is significant. There is no reason to believe the reliance on GPS will not continue to grow going forward. The military has undertaken improvements in GPS to improve its performance (M code, new RF frequencies, etc.).

The U.S. military routinely finds itself in asymmetrical conflicts with non-nation states. The consequence of GPS denial for these enemies is far less than for the U.S. military. Further, given the complexity of attacking targets in the context of asymmetrical/non-nation state warfare, the need for precision weapons will grow. Coupling this with the availability of SDR technology, less well-funded and technologically capable adversaries can more easily deny and disrupt GPS. The likelihood and sophistication of the attacks will increase in light of the underlying trends.

As a result of these significant factors lead to the following conclusions:
 The civilian and military reliance on GPS/location estimation capabilities will continue to grow
 The threat of unintentional interference and intentional jamming/spoofing will continue to grow
 Avenues to meet the demand and thwart the unintentional and intentional interference are to harness SDR technologies and leverage the diversity in measurement sources being provided by alternate GNSS and augmentation techniques.

DETAILED DESCRIPTION

The present disclosure addresses the shortcomings in the prior art and provides improvement in several aspects. In one aspect, the present disclosure provides the ability to use estimates of the location/velocity of the agents derived from SoOP measurements to assist the tracking of GPS/Nav Sat satellite signals (or other RF sources with characteristics like GPS) via ultra-tight coupling or to discriminate multipath conditions. In another aspect, the present disclosure provides the ability to time tag RF signals at each agent if the agent local time source ("clock" or "reference") is not precise or available to the SLAM agent application; In yet another aspect, the present disclosure provides the ability to include measurements from non-RF sources in geolocation estimation process (other "landmarks" in SLAM terminology) In another aspect, the present disclosure provides the ability to dynamically change the representation of landmarks (especially for the purpose of exchanging landmark data between agents) as a function of agent platform capabilities and condition and inter-agent communication facilities. In yet another aspect, the present disclosure provides a preferred embodiment that addresses operation in the ubiquitous population of existing smart cell phones and their host networks.

Figure 1:
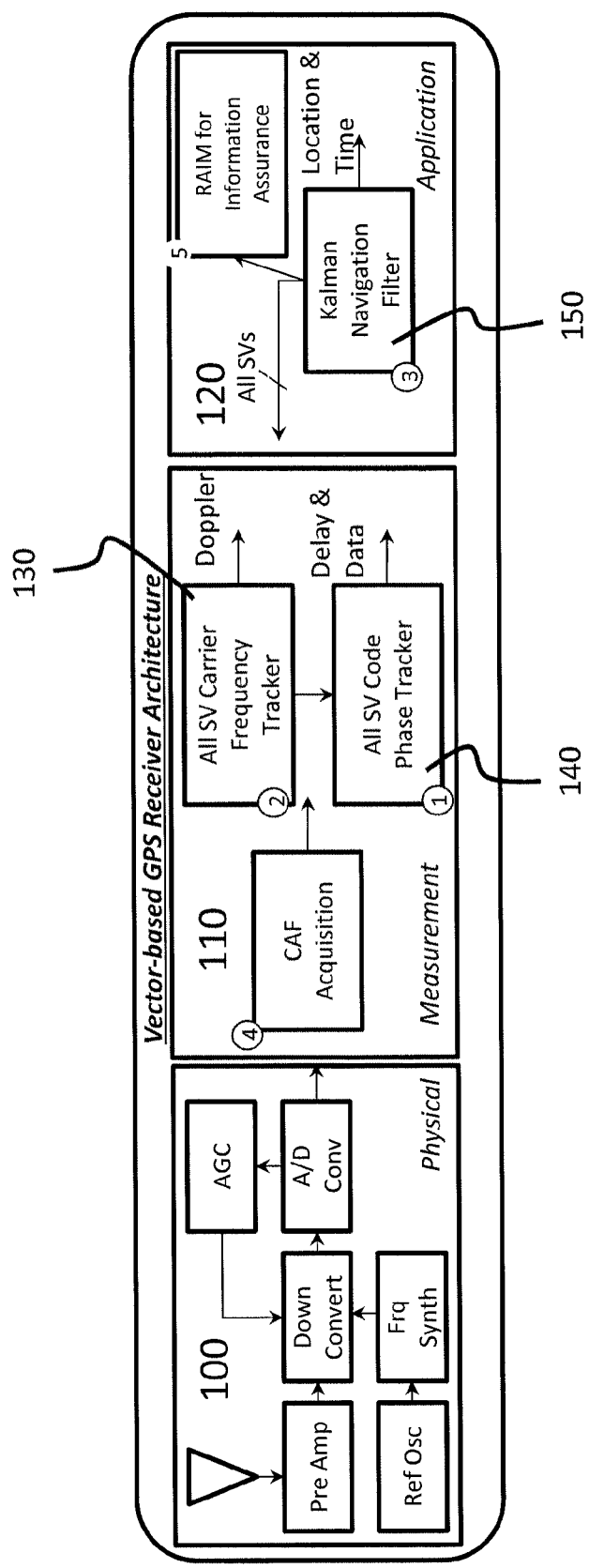
FIG. 1 is a simplified illustration of a prior art satellite receiver architecture.
Figure 2:
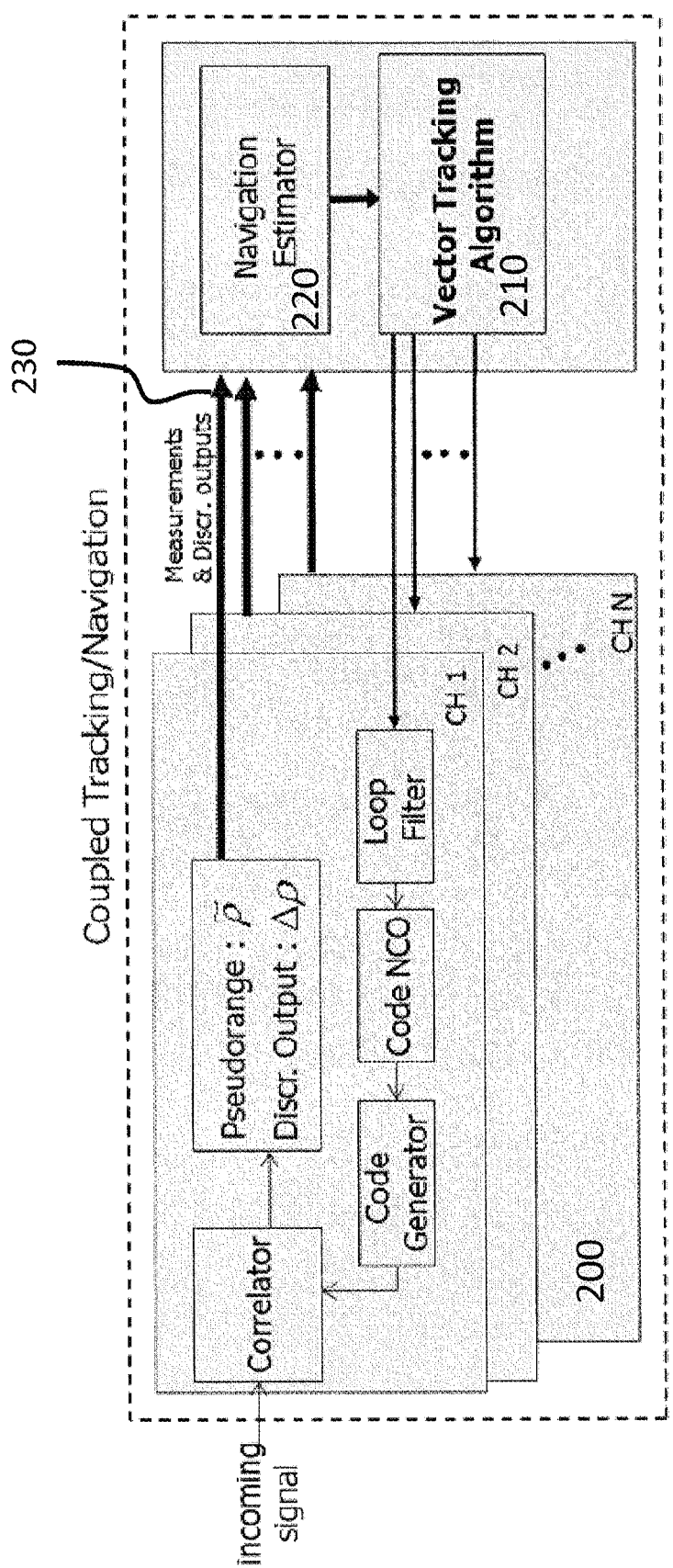
FIG. 2 is a simplified illustration of a prior art vector delay lock loop.
Figure 3:
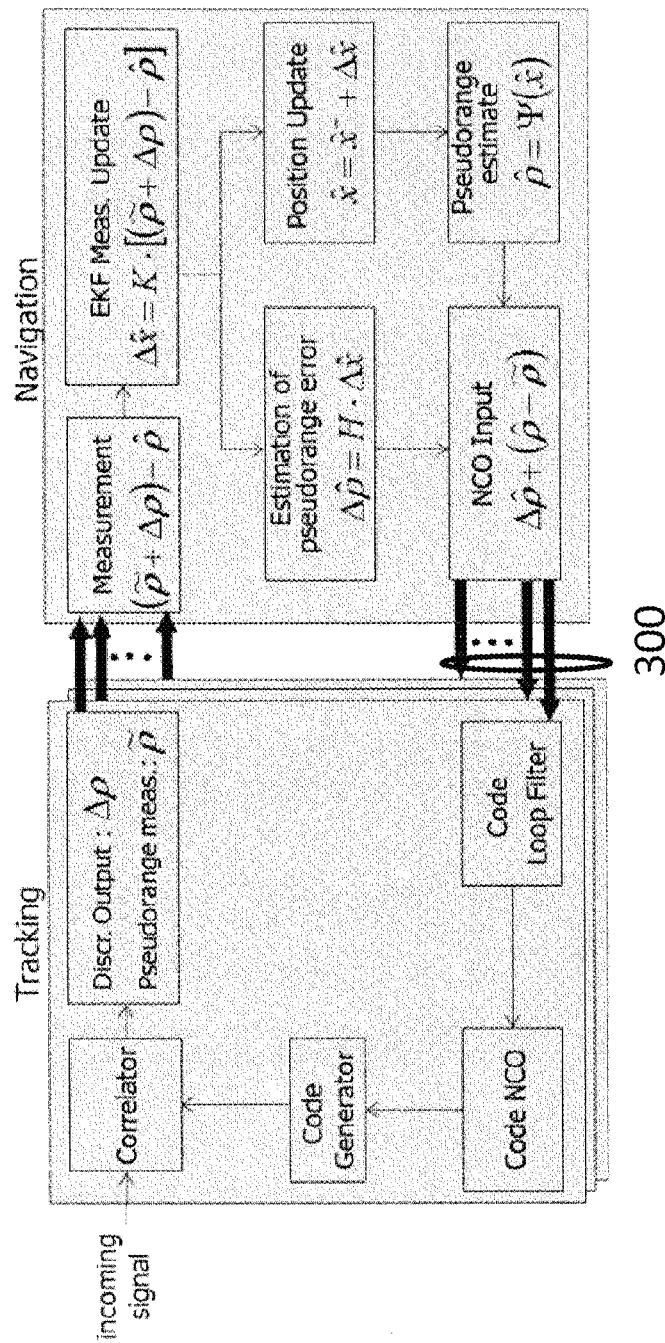
FIG. 3 is a simplified illustration of a prior art code phase vector tracker.
Figure 4:
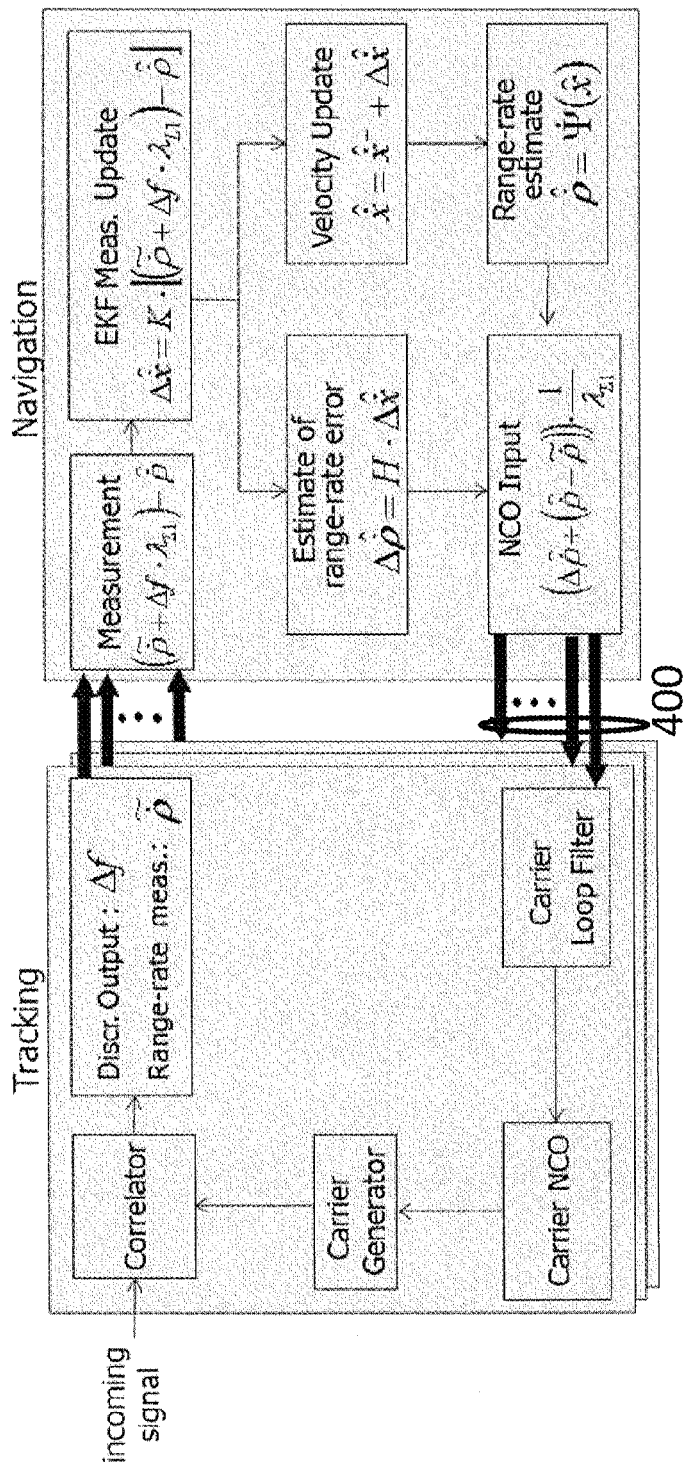
FIG. 4 is a simplified illustration of a prior art carrier frequency vector tracker.
Figure 5:
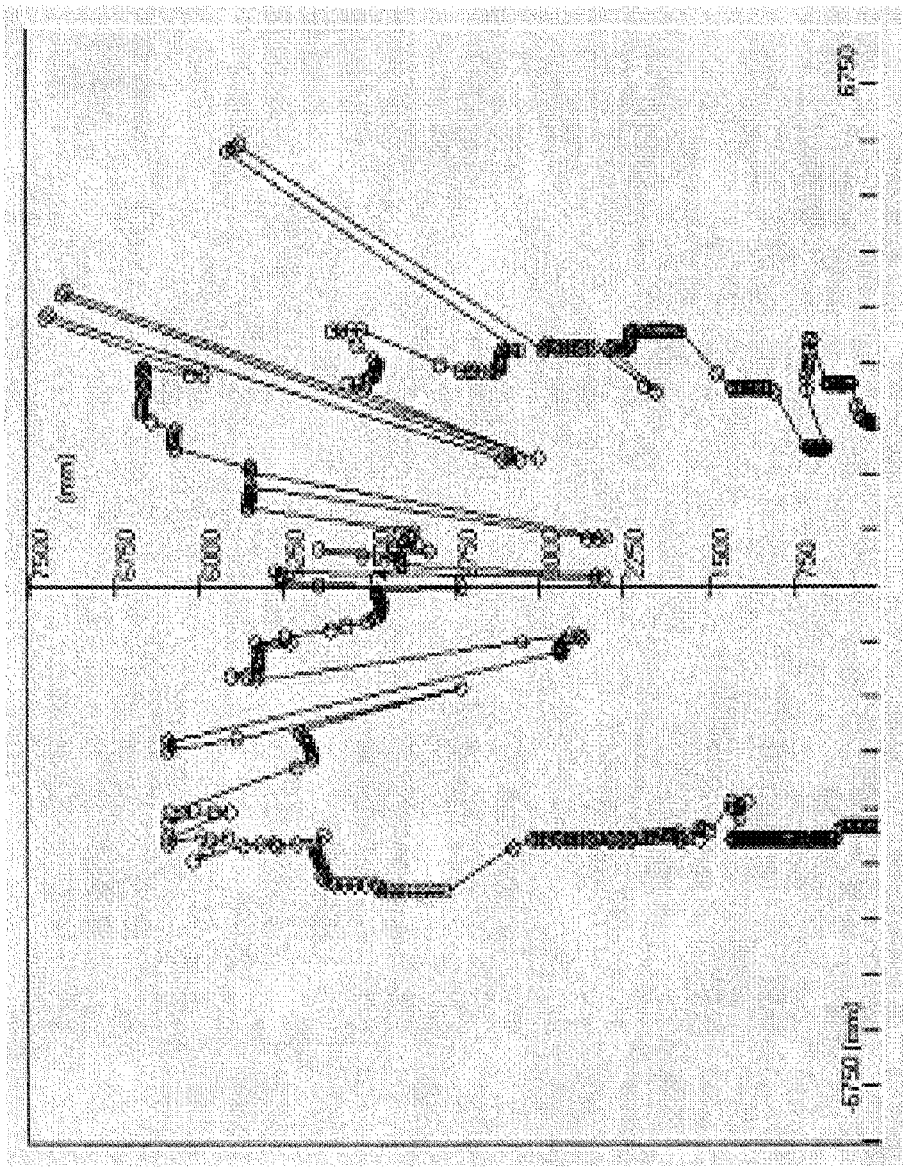
FIG. 5 is a simplified pictorial representation of a plot of range versus angle data for a prior art laser scanner.
Figure 6:
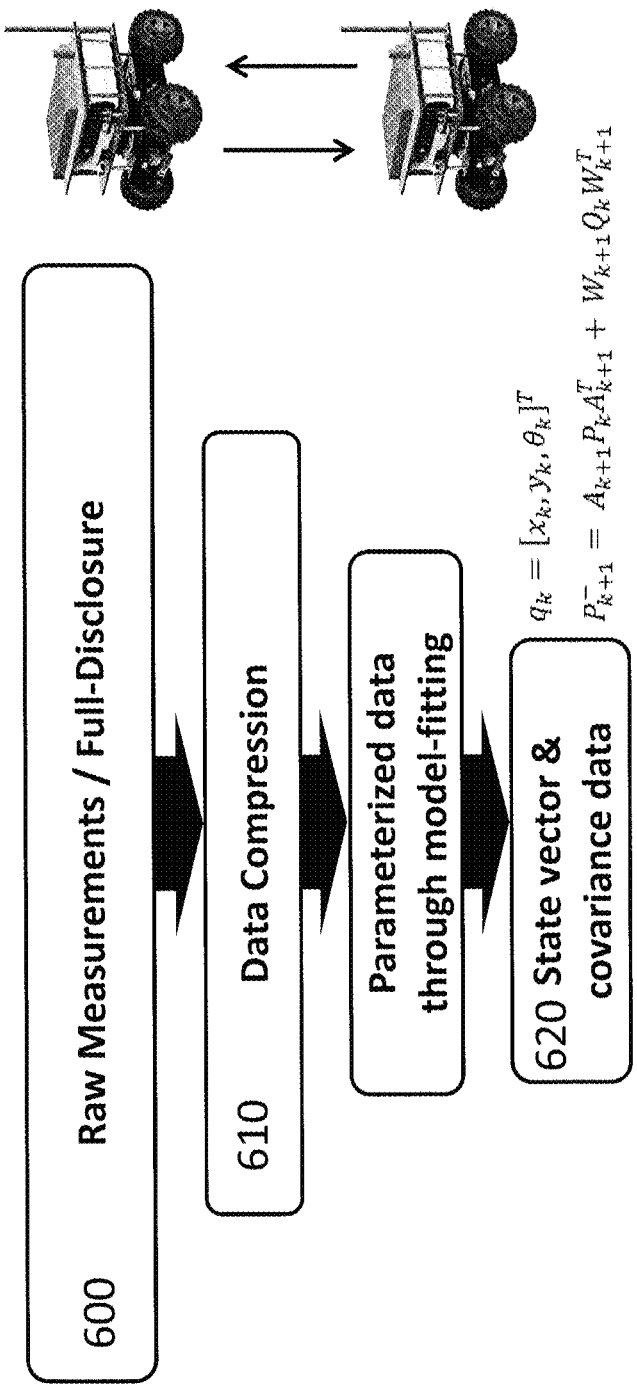
FIG. 6 is a simplified flow diagram of prior art feature representation and map sharing.
Figure 7:
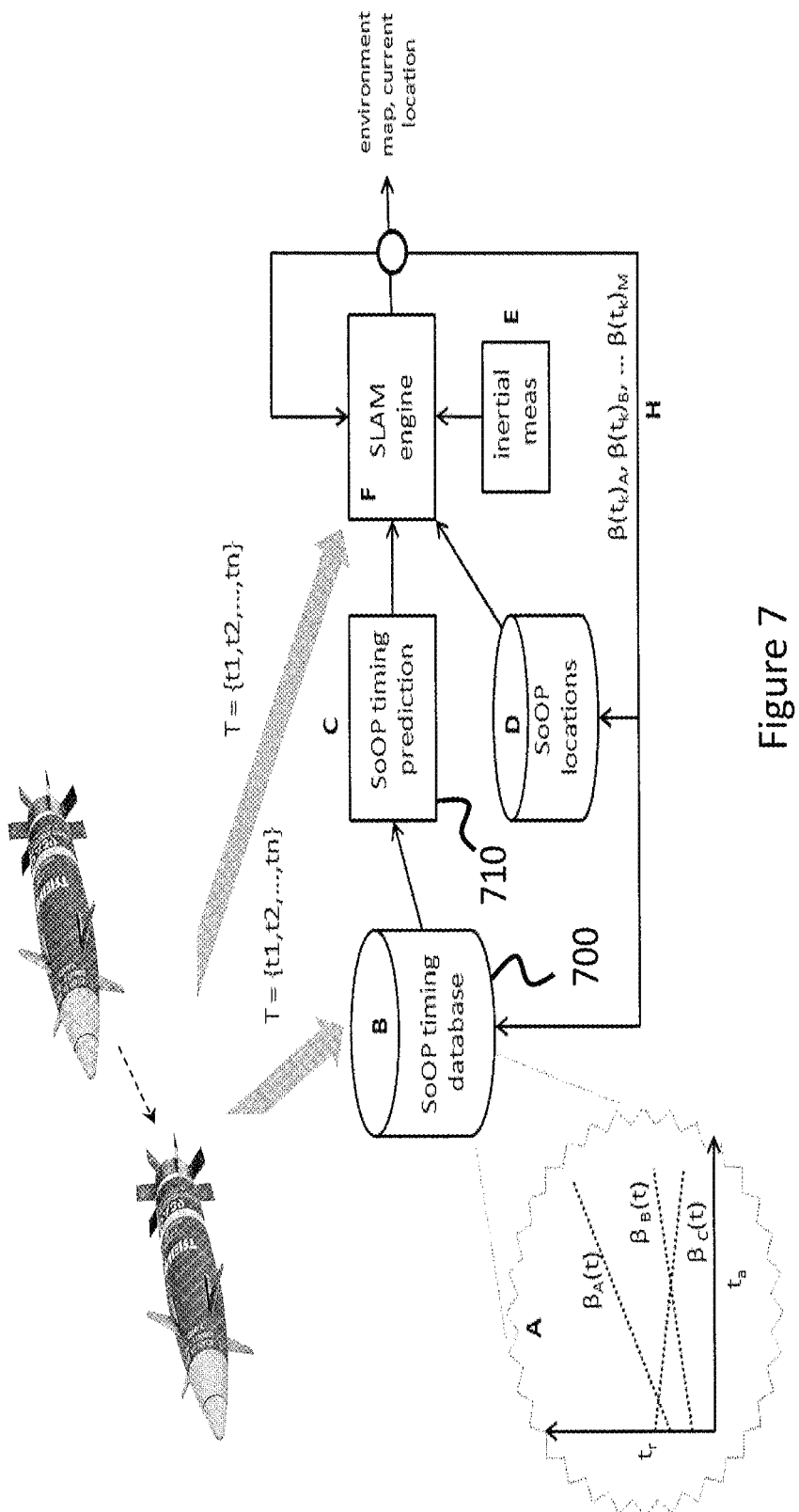
FIG. 7 is a simplified diagram of a prior art SMARTS algorithm.

The present disclosure also provides improvement over the systems and methods described in U.S. patent application Ser. No. 13/250,134. The '134 patent application describes using measurements from a heterogeneous mix of a priori known and/or unknown sources, synchronized and/or unsynchronized, captured by multiple cooperating networked nodes to provide robust location estimates. In one described embodiment, multiple mobile nodes (agents), equipped with SDR-based receiving assets, and interconnected via a robust ad-hoc wireless network or collaborative server, cooperate to estimate each agent location. Agents discover and make measurements on an arbitrary number of heterogeneous, unknown, unsynchronized and un-located signals of opportunity (SoOPs). SoOP existence and measurements are shared between agents to facilitate measurement making and to enable the simultaneous estimation of agent location, SoOP location, and synthetic inter-SoOP timing synchronization (simultaneous mapping and relative timing using SoOPs algorithm (SMARTS)) as shown in FIG. 7. The discovery and identification of the SoOPs can use characteristics of the SoOP in the physical plane, control plane or user plane, including specific emitter information (SEI). The SoOP transmissions can also include multiple input multiple output (MIMO) transmissions for a single physical SoOP. The SoOPs can include femotocells, repeaters, in-building distributed antenna systems (DAS) and proximity or time-aiding beacons. These SoOPs are especially useful for indoor location applications. The interconnecting wireless network can include the WiFi standard or cellular radio standards such as GSM and UMTS using either the control or user plane. The transmitting end of the wireless communications link can also serve as a SoOP.

Another embodiment described in the '134 patent application uses the SMARTS algorithm includes extending cooperative SLAM algorithms to include RF sources vs. optical sources, range differencing in addition to, or replacing range measurements, and/or timing synchronization-related measurements using both unsynchronized and synchronized SoOPs; and/or use of a synthetic aperture using moving agents. A described embodiment of the agent timing measurement technique includes where aiding information is interchanged between agents to improve, among other things, integration time where aiding information is in the form of demodulated bits, frame/slot timing, synchronization/other repeated sequences, frequency offsets, and timing relative to a common standard. Another described embodiment of the cooperative SLAM algorithm includes use of available mechanical measurements in the solution. One described embodiment uses one agent making SoOP measurements over time to form a synthetic aperture to populate the SLAM equations and calculate geolocation-related estimates. The '134 patent application does not include any timing reference stations, or other additional infrastructure nodes, and does not place any restrictions on the types of SoOPs to be used in the navigation or geolocation solution.

Figure 8:
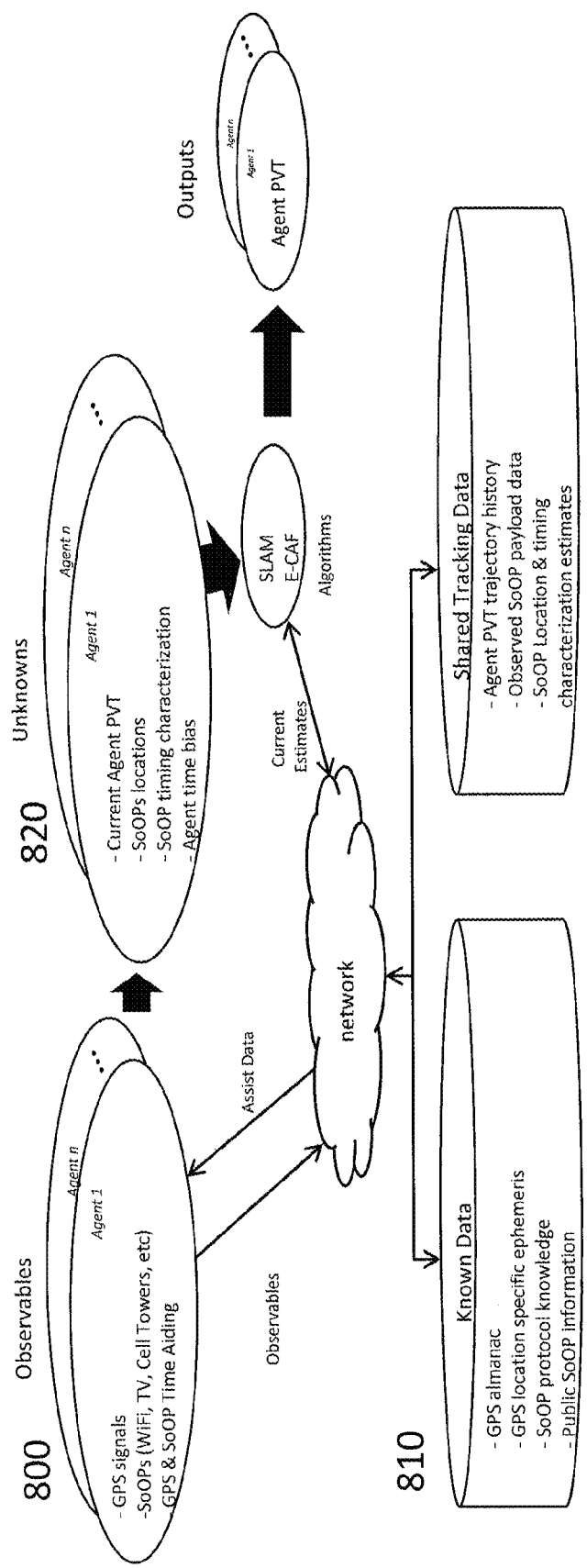
FIG. 8 is a simplified diagram of a prior art HIGGS algorithm.

Another embodiment described in the '134 patent application provides the ability to simultaneously compute position, time, time bias, SoOP timing relationships and drift rates, and SoOP positions in the absence of other aiding data such as inertial instrumentation or reference timing stations through the Hybrid Iterative GPS/SoOP Solution (HIGSS) algorithm as shown in FIG. 8. In this case, GPS satellite transmissions are used as another SoOP source. The approach provides a technique for synthesizing and disseminating acquisition assistance data for GPS-sourced measurements, as well as for the acquisition of SoOPs. This is particularly useful for increasing the number of available SoOPs used for GPS position and timing aiding as a result of the resulting sensitivity improvement. Referring to FIG. 8, a set of observable measurements from one or more agents contains one or more of the following:

Observed GPS pseudo-ranges (800)
Observed SoOP times of arrival from SoOP sources such as: WiFi access points, cell towers, WiFi transmissions from nearby agents, TV stations, mobile wireless devices, AM/FM radio, etc. (800)
GPS & SoOP aiding data which contains (810):
  GPS almanac, ephemeris, and navigation data
  If coarse location is known, specific Doppler and time search windows for each GPS satellite
  Known and measured SoOP information such as cell tower data payloads from broadcast signals as measured by other agents or derived through a-priori public information
  Current SoOP relative timing estimates.
The unknowns that must be continuously solved for and tracked by all agents are the following (820):
  Current agent PTV (Position, Time, Velocity)
  Locations of SoOPs (if not known a-priori)
  SoOP timing characterizations, as estimated through observations over time. This includes relative SoOP timing relationships, relationship to absolute GPS time, and characterization of time drifts.
  The time bias that exists within each agent due to local oscillator error.

The present disclosure provides several improvements to the '134 patent application. In one aspect, the present disclosure uses estimates derived from measurements in the extended Kalman filter to assist the tracking of GPS/navigation satellite signals.

Figure 9:
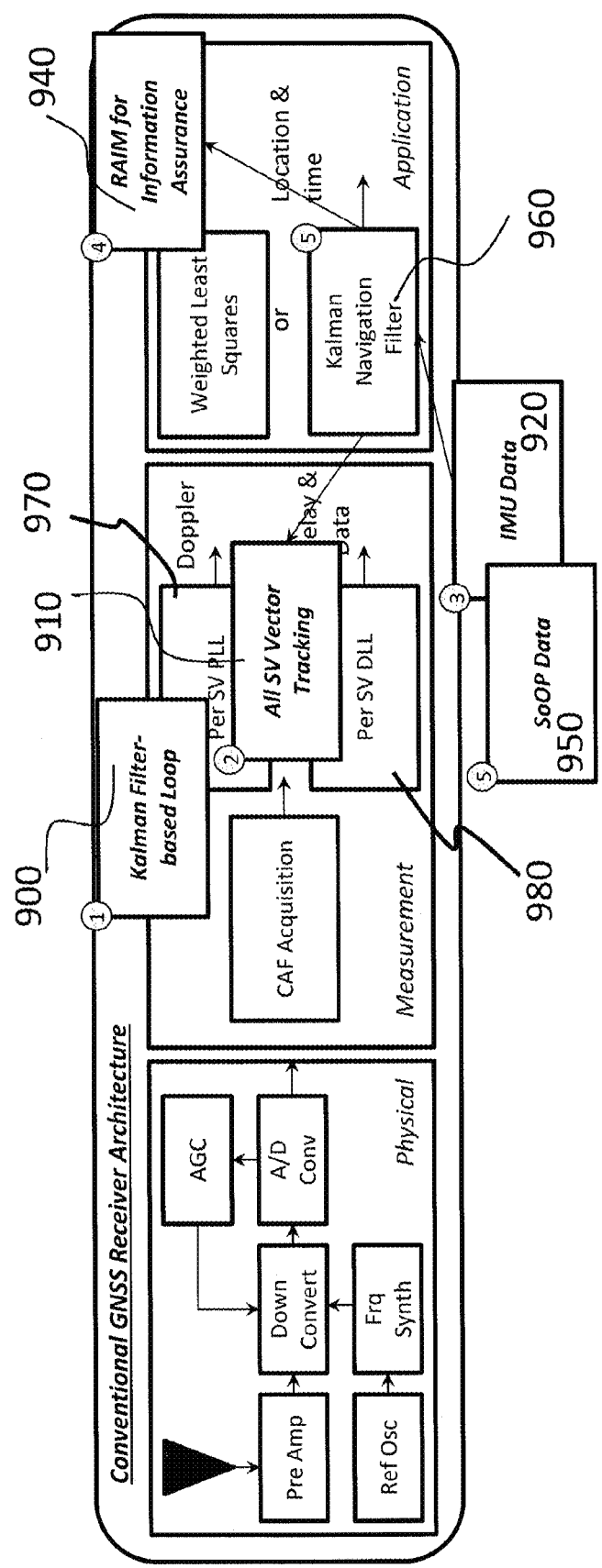
FIG. 9 is a simplified illustration of one embodiment of the current disclosure.

In one embodiment, estimates of the location/velocity of the agents derived from SoOP measurements are used to assist the tracking of GPS/Nav Sat satellite signals. At a high level, the state of the art in GPS signal processing is the use of vector tracking techniques (code phase, carrier frequency and optionally carrier code) and ultra-tight coupling of GPS to other location related measurement sources (such as IMUs). Vector tracking refers to the replacement of individual satellite vehicle (SV) tracking loops with a common statistical filter (such as an EKF) that drive each loop oscillator. This configuration provides a means to take into account the position and motion of the User Equipment (UE) (which is common for each satellite) and the track of each satellite when updating the loop oscillators. In this way, high quality measurements received from some SVs can compensate for low quality measurements from other SVs in adjusting oscillators in the tracking loops. Ultra-tight coupling refers to the process whereby location related measurements from non-GPS sources (such as velocity from an IMU) can be used to help update loop oscillators during periods of poor GPS reception. Ultra-tight coupling also uses statistical filtering (EKF) to estimate UE location and optimally use measurements. In order to fully appreciate the teachings of the present disclosure, a summary of the progression of signal processing in GNSS receivers as SDR technology has come to fruition is useful. A traditional SDR-based GNSS receiver (translating traditional hardware functions to software) is shown in FIG. 9 with functions in white colored boxes.

The use of Kalman Filters in the tracking loops for each SV (900 was an early innovation replacing the carrier frequency tracking loop 970 and code phase tracking delay lock loop 980. This implementation was replaced by vector tracking 910, driven by the navigation filter EKF 960. Mechanical measurement data sources 920 were then added to the navigation filter 960 in an ultra-tight coupling (UTC) mode. Finally, RAIM (receiver autonomous integrity monitoring)-like techniques 940 to detect anomalies were added to test measurements from the navigation EKF 960.

One improvement to this prior art processing included in the present disclosure is the inclusion of landmark-derived data (for example optical and SoOP RF landmarks (referred to as SoOP data in the diagram) 950 and in a modification to the Kalman Navigation Filter 960. The modification to the Kalman Navigation Filter 960 applies the SLAM framework to serve as the basis for the Kalman Navigation Filter allowing these new SoOP data sources 950 to contribute to the state estimate. This navigation filter estimates position, velocity and time (PVT) while controlling vector tracking loops using GPS, INS and landmark source data.

In another embodiment, the use of the modified Kalman navigation filter 960 and the SoOP information 950 mitigates multipath. The novel EKF 960 design uses a SLAM formulation where the state vector includes information on both the GNSS receiver position, velocity and clock condition, but also on the landmark/RF sources (position and clock parameters). Further, its dimension is modified as a function of the number of RF signal sources or receipts from the RF sources (multipaths). This formulation provides a means to spawn and prune new entries in the state vector as a function of acquired sources (signals from different satellites and their multipaths). Spawning and pruning decisions can be made using a number of known techniques including genetic algorithms.

The spawning source data can be created by a cross ambiguity function (CAF) peak search function around the currently tracked signal (CAF sub-space) to control the EKF state creation/pruning function. Due to the harsh propagation environment encountered in urban areas including high attenuation and multipath, long integration time CAF processing can be used to detect signal presence and separate multipath which is closely spaced in delay and frequency. The technique call enhanced CAF (described in the prior art) allows localized CAF plane searches with very high computational efficiency. The algorithm can be used to detect multiple signal arrival conditions and to control the spawning/pruning of EKF state vector entries to track the states. For example, suppose a navigation system is hosted on a terrestrial vehicle operating in an open sky environment. In this case, a CAF plane search for peaks would yield one peak per satellite (the line of sight path), and the EKF would track one set of entries in the state vector associated with that path. If the host vehicle moves from an environment with open sky to one with direct path blockage and multipath (operation in an urban canyon), then the CAF peak search may yield multiple results per satellite, and the peaks may appear and disappear as a function of the position of the vehicle with respect to the surrounding urban topology. In this case, the EKF may have state vector entries associated with multiple peaks from one satellite, and the state vector may increase or decrease the number of tracked signals dynamically. The tracked signals could be direct path or multipath at various times. The dynamic tracking of these paths provides additional information to the EKF for position and time estimation.

In another embodiment, the present disclosure has the ability to time tag RF signals at each agent if the agent local time source ("clock" or "timing reference") is not precise or available to the SLAM agent application. Referring back to FIGS. 7 & 8, processes are defined in the prior art to allow asynchronous SoOP signals to be used for location estimation (referred to in the figures as "SoOP timing database" 700, and "SoOP timing prediction" 710. These processes rely on the presence of a local time reference "clock" in the SDR at each agent to time stamp the received signals. The local time references do not have to be synchronized, but must be present and of sufficient precision and local referencing to support time stamping so that a location of a mobile can be determined. In one embodiment, an alternate method of time tagging is used if such a time reference having the requisite precision is not present.

In general, the collection of SoOP signal samples at the agent is done through digital sampling and storage. If no local reference can be applied to the digitization process, then an alternative is to expand the digitization process to simultaneously include the SoOP and another RF signal that can then be used as a time reference. Examples of time reference RF signals are GNSS signals, CDMA base station downlink pilots and other broadcast signals that include time or reference information. In one embodiment, these signals can be simultaneously digitized and stored using analog or digital filtering and mixing to place the SoOP and timing reference signal into the same band to be commonly sampled. Once the samples are in a digital form, they can be separated by filtering and the time reference data can be extracted. In one embodiment, this feature can be implemented in smart phones. A SoOP digitizing function may be added to the phones (perhaps as a USB attachment or through external memory card device interfaces) which would allow RF SoOPs of interest to be sampled and stored.

The SoOP digitizer may be controlled by an application program such as a special purpose Android application.

In operation a mobile device which does not have a timing reference of sufficient precision to determine the location of the mobile device can extract timing information from a SoOP. The mobile device may receive a first signal where the first signal does not contain a timing reference. At around the same time the mobile device can also receive a second signal, where the second signal does include a timing reference. The mobile may be able to derive a time stamp from the timing reference of the second signal. If the second signal is received sufficiently close in time to the first signal, the time stamp for the second signal can be used as a time stamp for the first signal. Thus, even though the first signal and the mobile device do not have a timing reference, the mobile device can derive a time stamp from the second signal which can be used as a time stamp for the first signal. The first signal with the time stamp can now be used to determine the location of the mobile device. In one embodiment, the first signal and time stamp can be used with additional received signals having time stamps to determine the location using time of arrival (TOA) and time difference of arrival (TDOA) methods. The mobile may have the processing capability to process the signal to determine its location or can transmit the relevant signals to a processor to determine the location. The location functionality can also be distributed over several processors.

It is not uncommon for RF receivers to have underutilized RF capability that can capture information that can contribute to the navigation environment. For example, a smart phone may have several RF receiving assets, including, WIFI, GPS, 2G, 3G 4G etc. Thus this single platform can use multiple receiving assets to make measurements on SoOP. However, timestamp data is generally not required for LTE or VOIP communications, but navigation normally requires time stamped data. In one aspect, this problem can be solved by sampling LTE and GPS data simultaneously in the RF band and embedding the time stamp derived from GPS with the digitized LTE data. Thus the LTE data embedded with the GPS derived time can now be used for navigational purposes. Other embodiments could include moving the digitized SoOP data over the user plane (vs. the control plane), using a custom Android application; and/or the coordination of SoOP sample taking and/or location estimation by a network entity such as the SMLC or GMLC in a 3GPP architecture.

In another aspect, in the cell phone case, it is not uncommon for communication assets to not have direct communication contact with each other on a non-dedicated basis. For example, two mobile telephones may be in communication with the same base station but have no awareness of each other. However for navigational purposes, it could be very useful if the two mobile phones were able to exchange SoOP information between each other. In one aspect the infrastructure network can act as an inter-agent data transfer facility and exchange navigational information between mobile assets on an ad hoc basis to exploit SoOP information that could previously not be utilized.

For example, mobile phone 1 could receive and measure parameters on RF source 1. RF source 1 would not need to be part of the cellular network. Mobile phone 2 could also receive and measure parameters on RF source 1. The measured parameters made by phone 2 could be communicated to mobile phone 1, allowing mobile phone 1 to use these measured parameters to estimate its position. The communication of the measured parameters could be through direct connection or through the infrastructure.

In operation, the location of a mobile device in a wireless communication network that is infrastructure based in that the mobile device communicates to other mobile devices through the wireless network can be determined using signals that are not associated with the wireless communication network. For example, a mobile device can receive an RF signal not associated with the wireless communication network, such as a television signal, a navigation signal or the like. The mobile device can determine a parameter associated with the first signal such as a digitized portion of the first RF signal or a measurement made on the first RF signal. This parameter can be transmitted by the first mobile, through the wireless communication network, such as a base station or other infrastructure, to a second mobile device. The second mobile device can receive this parameter and combine it with a parameter that it determines from a received second RF signal to determine the location of the second mobile device. The second RF signal may be associate with the wireless communication network or it may not be associated with the wireless communication network, or it may even be the same RF signal received by the first mobile device.

In another embodiment, the present disclosure includes the ability to include measurements from non-RF sources in geolocation estimation process (other "landmarks" in SLAM terminology) and the ability to dynamically change the representation of landmarks (especially for the purpose of exchanging landmark data between agents) as a function of agent platform characteristics and condition inter-agent communication facilities. For example, a single landmark may have different levels of resolution depending on the intended use of the landmark by an agent. More accurate solution may require that the landmark be represented by higher resolution processing. For example, a landmark may be represented by a JPEG image, or it may be represented by vectors. The innovation is through feature representation and map/information sharing methodologies using extensions of the steady state Riccati recursion framework for Multi-Agent Simultaneous Localization and Mapping (MA-SLAM) performance prediction. Features may include both conventional navigation and non-conventional features such as Radio Frequency Signals of Opportunity (RF SoOPs). The combination of RF sources with non-RF sources provides added flexibility to the navigation solution. For example, traditional RF SoOP can be combined with ultra-sonic ranging, optical ranging measurements which can be digitized an combined with RF ranging sources.

Figure 10:
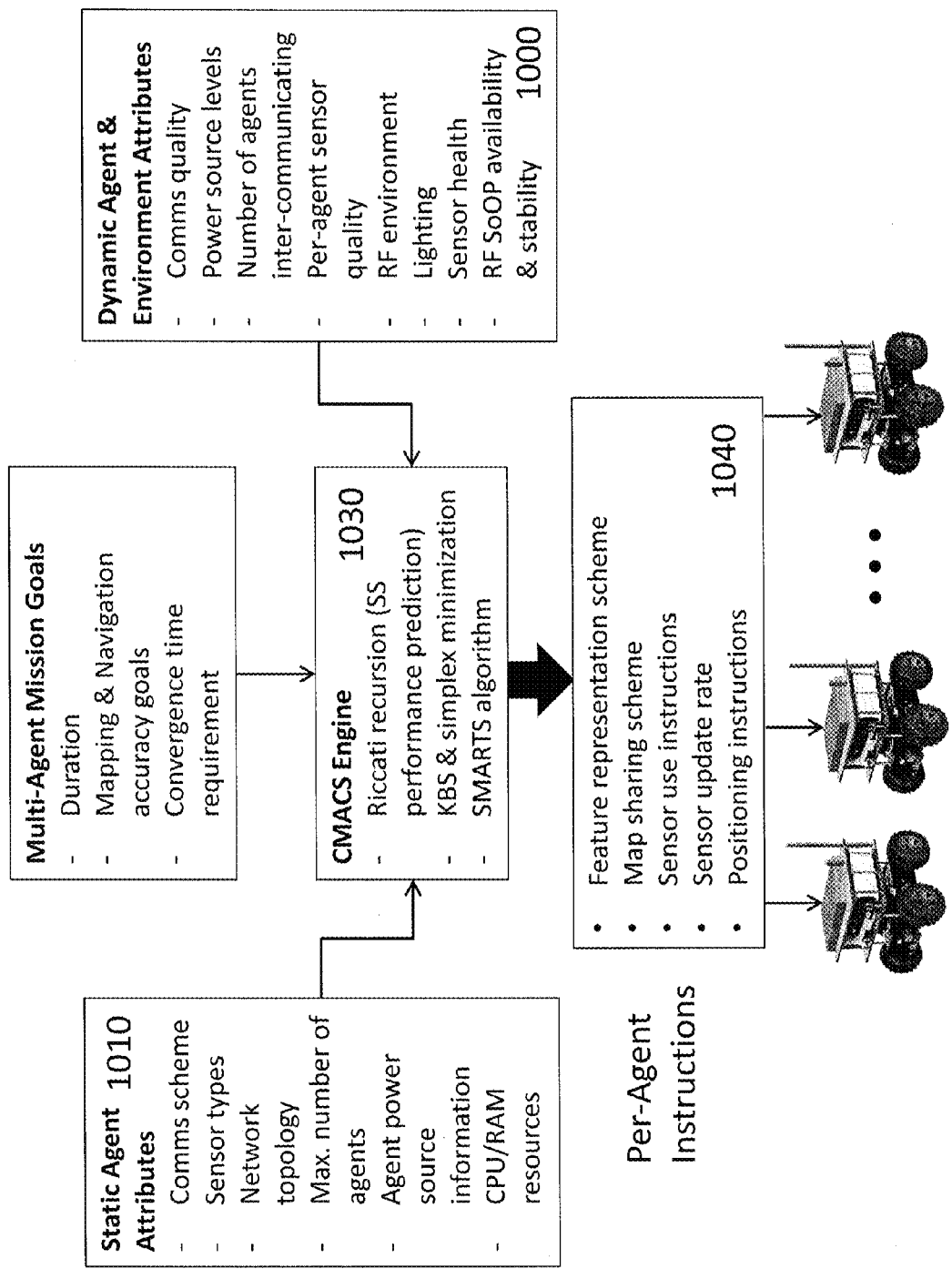
FIG. 10 is a simplified illustration of one embodiment of the present disclosure using a Cognitive Multi-Agent Cooperative SLAM engine.

RF SoOPs are an extremely useful and robust feature set that nicely complements existing measurement data used in current navigation systems. A logical extension of this analytical performance tradeoff analysis is to formulate a new algorithm entitled Cognitive Multi-Agent Cooperative SLAM, or CMACS. CMACS can be a real-time software application running on agents. Its objective is to dynamically adapt how each agent behaves in the context of a MA-SLAM application and as a function of static and changing dynamic factors in order to meet the operational goals most efficiently and effectively given a prescribed agent fleet mission as shown in FIG. 10.

Dynamic factors (1000) may include current communications link qualities, power source levels, number of agents inter-communicating, lighting, sensor measurement qualities, RF environment, and RF SoOP availability and stability. Static factors (1010) may include the communication scheme being used, network topology, the individual agent sensor capabilities, the number of agents, agent CPU and RAM resources, battery life, etc. CMACS engine 1030 will optimally formulate: 1) the most appropriate feature representation and map sharing scheme, 2) adjust which sensors are to be used, and 3) adjust what the update rates should be as a function of the predicted steady state performance and the changing operational environment (1040).

Navigational measurements that exceed the bandwidth capability of the inter-agent communications network can lead to useful information being lost or not considered. For example, given a plurality of agents each having navigational measurements, agents can be selected based on the selected goal of the navigational solution. Accordingly, agents having common SoOPs may be selected for inclusion in the navigational solution over agents not having this criteria.

In one embodiment, the CMACS engine may use the Riccati recursion. An accepted bound for MA-SLAM navigation performance prediction is the Riccati recursion. This formulation can be used to generate the predicted error covariance matrix prior to getting any observations, which can subsequently be used to predict the upper-bound and/or the average, or steady-state uncertainty. Briefly, the Riccati recursion can be described as follows, in which $\bar{P}_\infty$ is the steady-state covariance matrix of the position estimates in MA-SLAM.

$$\bar{P}_\infty = \begin{bmatrix} \bar{P}_{rr\infty} & 0_{2M \times 2N} \\ 0_{2N \times 2M} & 0_{2N \times 2N} \end{bmatrix} + 1_{(M+N) \times ((M+N)} \otimes \bar{\Theta}^{-1},$$

where $\bar{P}_{rr\infty} = \bar{Q}_{r_u}^{1/2} U \text{diag}\left(\frac{1}{2} + \sqrt{\frac{1}{4} + \frac{1}{\lambda_i}}\right) U^t \bar{Q}_{r_u}^{1/2}$ The complete formulation can be found in prior art. The premise is that the measurement and time updates to the covariance matrix P (or the state prediction error) within the context of an EKF can be expressed by a Riccati recursion equation, whose steady state properties can be expressed through a closed form solution. This bound can be extremely useful for the purposes of determining what subset of sensor measurements to use, what features to use, and what feature representation scheme should be used in order to satisfy the navigation accuracy requirements. Our new method uses the Riccati recursion within the CMACS algorithm as the key component of the adaptation technique when predicting performance.

Practical MA-SLAM solutions are size, power, processor, and bandwidth constrained. One prior art problem is that all collaborating agents in current solutions are forced to operate in a sub-optimal fashion. For example, feature representation, map and information sharing schemes, and sensor scanning rates are fixed ahead of time for all agents no matter what the operating condition or state. In some cases this may be contributing to large errors in the overall navigation accuracy of the agent fleet, and in other cases, there is an abundance of feature and sensory data that is simply unnecessary given the navigation uncertainty conditions. The use of static settings for many operational parameters is hugely sub-optimal and could be improved using some of the insight developed as part of these new methods.

In one aspect, the concept behind CMACS is to dynamically adapts itself as a function of multiple operational conditions, which are both static and changing. In summary, the goal of CMACS is to dynamically adapt how each agent behaves in the context of a MA-SLAM application and as a function of many changing factors in order to meet the operational goals most efficiently and effectively given a prescribed mission.

The mission goals of the multi-agent fleet may be specified prior to execution in terms of the expected duration of operation, the desired accuracy goals, and the convergence time requirements. The CMACS engine may utilize these high-level mission goals, along with static and dynamic attributes, and create fleet-wide guidance instructions describing how agents would operate in terms of what feature representation schemes to use, how information should be shared among agents, recommended sensor update rates, which sensors to use, desired positioning instructions, etc. Static agent attributes are non-changing factors such as: CPU and RAM resources, communications scheme in use, network topology, the number of the agents, etc. Dynamic agent and environment attributes are factors that will change over time such as communications link qualities, power or battery levels, sensing feature quality, lighting, etc.

Figure 11:
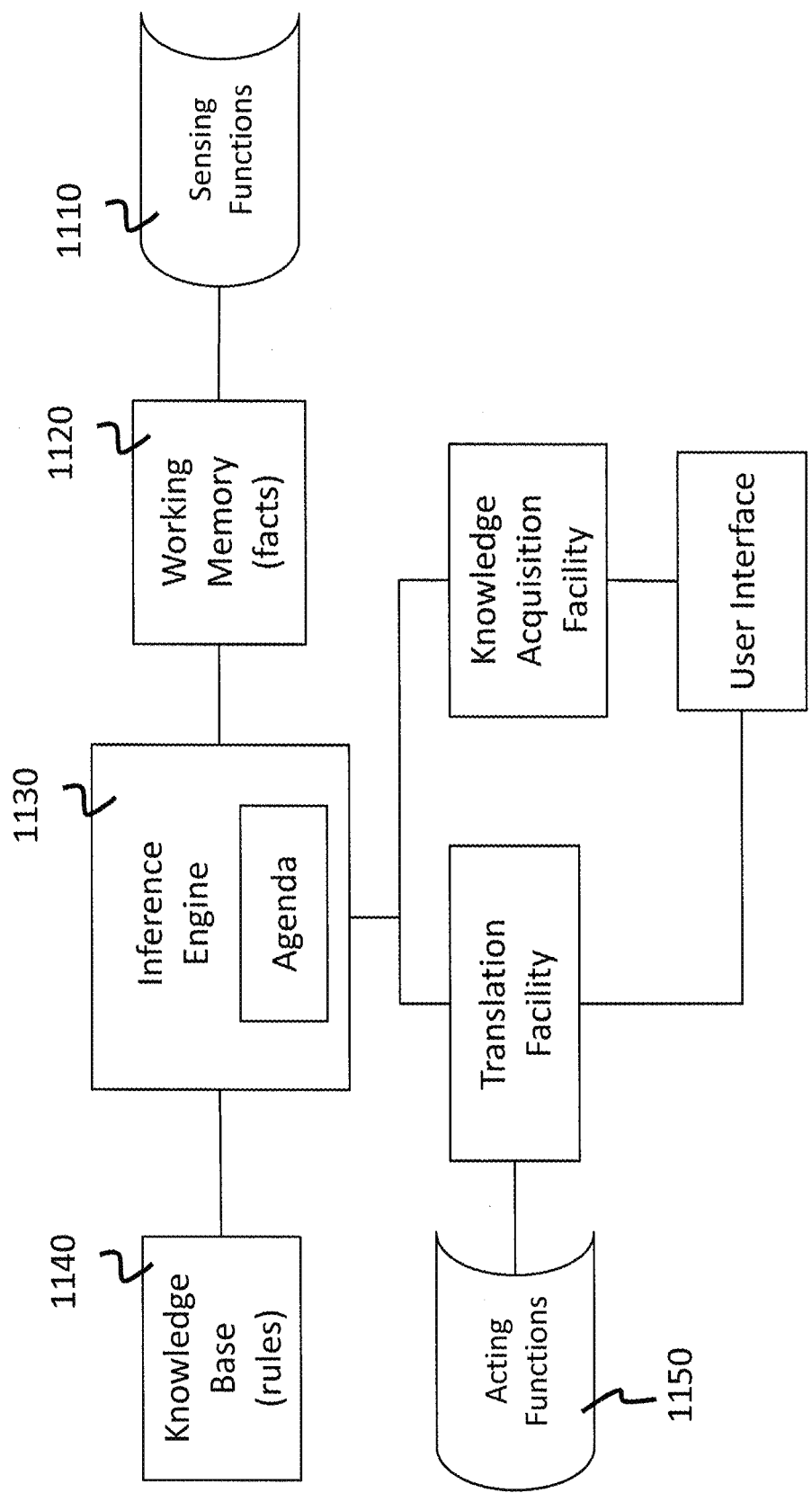
FIG. 11 is a simplified illustration of one embodiment of the present disclosure illustrating the application of a knowledge based system to a Cognitive Multi-Agent Cooperative SLAM engine.

With reference to FIG. 11, the core CMACS engine leverages prior work in Expert Systems, or Knowledge Based Systems and a prior art multi-dimensional constrained minimization algorithm called the downhill simplex minimization. KBS are especially useful when procedural if-then-else programming becomes too cumbersome in applications such as this where many sources of information and many possible conflicting outcomes could exist. This engine can run within a very compact open-source software application entitled CLIPS (C Language Integrated Production System) CLIPS would execute alongside other processes within each agent and collectively aid in the joint decision making processes by the agent fleet. Referring to FIG. 11, the Inference Engine (1130) schedules rules (1140) to be tested based on facts (1120) presented by the sensing function (1110). If the conditions of a rule are met, then some action is taken (1150). As a simple example, an agent could change the way features are represented in the network (acting (1150) through communications with its peers) based on a rule related to the degree of radio interference (rule stored in 1140 and scheduled in 1130), as measured in sensing function 1110.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, PDA or phone.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed:

1. A method of determining the location of a mobile device:
    (a) receiving a first signal of opportunity (SoOP) at a mobile device, wherein the SoOP is an ambient radio frequency (RF) transmission that is not intended for navigation, position or timing for positioning purposes and the mobile device does not include a timing reference having precision to determine the latitude and longitude location of the mobile device and wherein the first signal does not contain a timing reference, and wherein the first SoOP is transmitted from a system different than the communication system of the mobile device;
    (b) receiving a second signal at the mobile device, wherein the second signal includes a timing reference that provides a first time stamp for receipt of the second signal;
    (c) sampling the first SoOP and digitizing a portion of it;
    (d) deriving a second time stamp for the first SoOP based on the first time stamp of the second signal; and
    (e) using the digitized portion of the first SoOP with the derived second time stamp for the first signal to determine the location of the mobile device.

2. The method of claim 1 wherein the first SoOP is a mobile telephone signal and the second signal is a satellite navigation signal.

3. The method of claim 1 wherein the step of using the digitized portion of the first SoOP with the derived first time stamp to determine the location of the mobile device includes receiving additional signals having respective time stamps at the mobile device and determining the location of the mobile device from the digitized portion of the first SoOP with the derived first time stamp and the additional signals having respective time stamps.

4. The method of claim 3 wherein the location of the mobile is determined using time difference of arrival methods.

5. The method of claim 3 wherein the location of the mobile device is determined using time of arrival methods.

6. The method of claim 3 wherein the location of the mobile device is determined by the mobile device.

7. The method of claim 3 wherein the digitized portion of the first SoOP with the derived first time stamp and the additional signals having respective time stamps are sent to a central processor and the central processor determines the location of the mobile device.

8. The method of claim 3 wherein the mobile device is one of a mobile phone, a laptop, a tablet, a personal digital assistant, or a navigation device.

9. A system for determining the location of a mobile device:
    a mobile device wherein the mobile device does not include a timing reference having precision to determine the latitude and longitude location of the mobile device, including:
    a memory for storing computer readable code; and
    a processor operatively coupled to the memory, the processor configured to:
    receive a first signal of opportunity (SoOP), wherein the SoOP is an ambient radio frequency (RF) transmission that is not intended for navigation, position or timing for positioning purposes and wherein the first SoOP does not contain a timing reference;

receive a second signal at the mobile device, wherein the second signal includes a timing reference to provide a first time stamp for receipt of the second signal;

sample the first SoOP and digitizing a portion of it;

derive a second time stamp for the first SoOP based on the first time stamp of the second signal; and determine the location of the mobile device using the digitized portion of the first SoOP with the derived first time stamp for the first SoOP.

10. The system of claim 9 wherein the first SoOP is a mobile telephone signal and the second signal is a satellite navigation signal.

11. The system of claim 9 wherein the processor is further configured to receive additional signals having respective time stamps at the mobile device and determining the location of the mobile device from the digitized portion of the first SoOP with the derived first time stamp and the additional signals having respective time stamps.

12. The system of claim 11 wherein processor is further configure to determine the location of the mobile device using time difference of arrival.

13. The system of claim 9 wherein the mobile device is one of a mobile phone, a laptop, a tablet, a personal digital assistant, or a navigation device.

\* \* \* \* \*